March 5, 1929.  J. S. JUDELL  1,704,198
PLUMBING FIXTURE
Filed Feb. 17, 1927
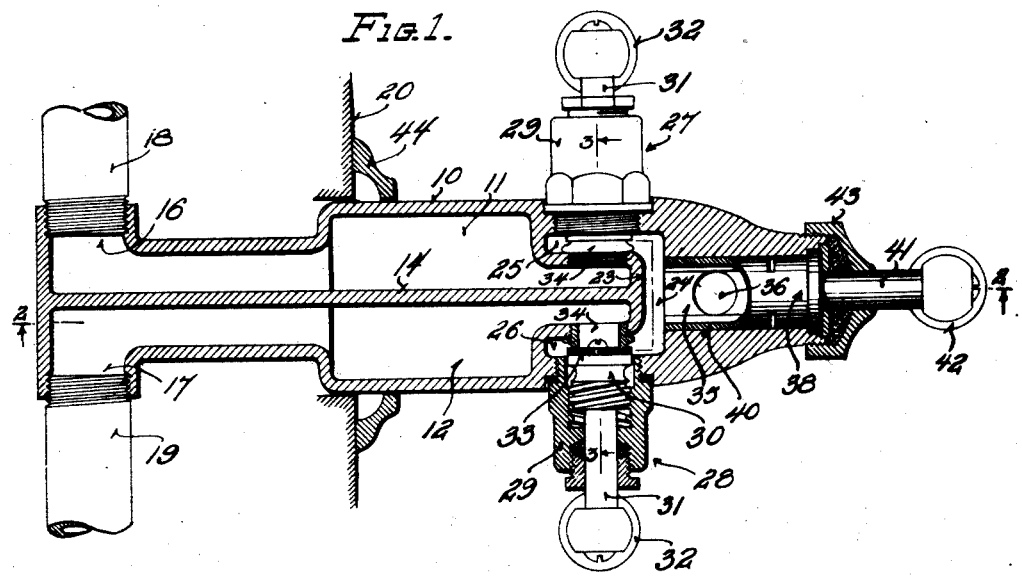
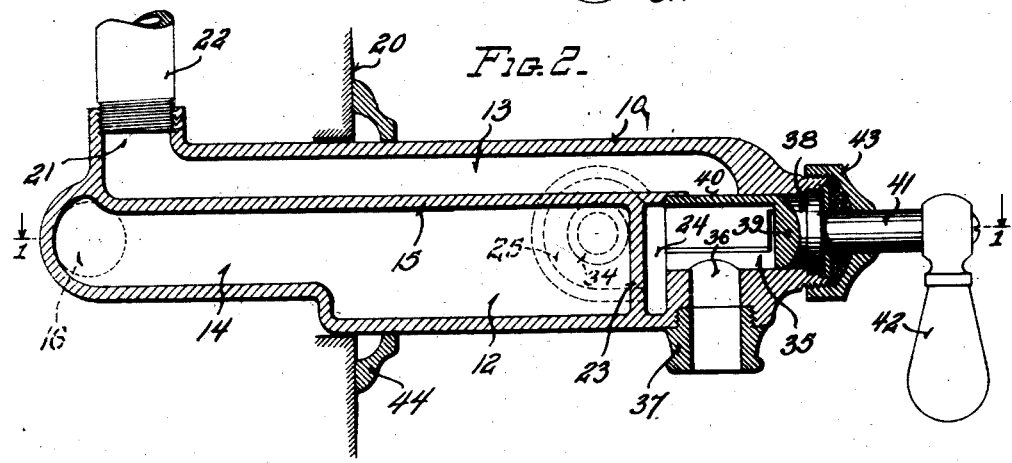
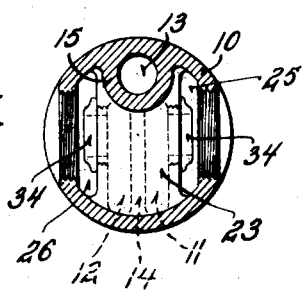
INVENTOR.
JULIUS S. JUDELL.
BY
ATTORNEY.

Patented Mar. 5, 1929.

1,704,198

UNITED STATES PATENT OFFICE.

JULIUS S. JUDELL, OF MILWAUKEE, WISCONSIN, ASSIGNOR TO THE MILWAUKEE FLUSH VALVE COMPANY, OF MILWAUKEE, WISCONSIN, A CORPORATION OF WISCONSIN.

PLUMBING FIXTURE.

Application filed February 17, 1927. Serial No. 168,893.

This invention relates to plumbing fixtures of the built in type for use primarily in supplying a controllable mixture of hot and cold water to either a tub or associated shower head.

Fixtures of this type ordinarily include a system of piping hidden within the wall from which a plurality of valves project into exposed accessible positions beyond the wall. As heretofore designed such fixtures are objectionable in that they require the formation of several openings in the wall to accommodate the several valves.

One object of the present invention is the provision of a fixture for the purpose named which will not require more than one opening in the wall. This I have accomplished by mounting the several control valves upon one end of a body portion shaped to project into a wall and having appropriate passages controlled by the valves and connectible through the other end of the body portion with the pipes within the wall.

Other objects and advantages will appear from the following description of an illustrative embodiment of the present invention.

In the drawings:—

Figure 1 is a horizontal sectional view, taken substantially along the line 1—1 of Figure 2, of a plumbing fixture constructed in accordance with the present invention.

Fig. 2 is a sectional view taken substantially along the line 2—2 of Figure 1.

Fig. 3 is a transverse sectional view taken substantially along the line 3—3 of Figure 1, with the valves removed.

The plumbing fixture selected for illustration comprises an elongated body portion 10 of circular cross section for the major portion of its length and divided internally into three longitudinal passages 11, 12 and 13. Passages 11 and 12 are arranged side by side and separated by a partition 14, while passage 13 is disposed immediately above and between the passages 11 and 12 and separated therefrom by a partition 15. The rear end of the body portion 10 is provided with appropriate openings 16 and 17 adapted to receive hot and cold water supply pipes 18 and 19, disposed within the wall 20, so that passage 11 is open to the pipe 18 and passage 12 to pipe 19. Passage 13 communicates through a similar opening 21 in the rear end of the body portion, with a pipe 22 leading to a shower head not shown.

The forward ends of the passages 11 and 12 are closed by a partition 23 shaped to provide a substantially U-shaped chamber 24 having branches 25 and 26. Appropriate valves 27 and 28 control communication between the chamber 24 and passages 11 and 12, respectively. In this instance each valve comprises a hollow plug 29 removably fixed within a side wall of the body portion 10 and having a rotary valve head 30 threaded therein and controlled by a stem 31 and handle 32. The valve head 30 carries a valve disk 33 which cooperates with a removable valve seat ring 34 threaded in the partition 23. It will be noted that this arrangement permits the ready removal of and consequent accessibility to the internal parts of each valve for inspection, replacement or repairing.

The passage 13 extends forwardly and opens through the top side of a bore 35 formed in and disposed axially of the forward end of the body portion 10, and open to the chamber 24. A passage 36, diametrically disposed with respect to the passage 13, leads downwardly from the bore 35 to a spout 37 through which the water is directed to a tub or the like. Passages 13 and 36 are controlled by a valve 38 of appropriate form. In this instance this valve comprises a cylindrical head 39 having a fragmentary sleeve extension 40, closely fitted for rotation within the bore 35 and open at one end to the chamber 24. The arrangement is such that in the position shown in Figures 1 and 2 the passage 13 is closed by the sleeve extension and the passage 36 is open to the chamber 24, and water admitted into chamber 24 is directed to and through the spout 37. By rotating the valve through substantially one hundred eighty degrees the sleeve extension closes the passage 36 and opens passage 13 to the chamber 24 so as to direct the flow upwardly through pipe 22 to the shower head. The valve 38 is equipped with an appropriate stem 41 and operating handle 42. The valve 38 is readily removable from the body portion 10 by first removing the retainer nut 43.

From the foregoing it will be noted that the chamber 24 constitutes a mixing chamber for receiving hot and cold water in proportions determined by the manipulation of valves 27 and 28. From the chamber 24 this mixture may be directed through passage 13 to the shower head pipe 22 or through the passage 36 and spout 37 to the tub in accordance with the setting of the valve 38. It will also be noted that the fixture described requires only one opening in the wall which opening may be hidden by an appropriate collar 44 encircling the rounded body portion.

Various changes may be made in the embodiment of the invention hereinabove specifically described without departing from or sacrificing the advantages of the invention as defined in the appended claims.

I claim:—

1. In a plumbing fixture the combination of an elongated body portion having a pair of longitudinal passages therein, separate inlet openings for said passages adjacent one end of said body portion, a third longitudinal passage in said body portion an outlet opening for said third passage adjacent said inlet openings, and valves adjacent the other end of said body portion for controlling communication between said third passage and said first named passages.

2. In a plumbing fixture the combination of an elongated body portion having a pair of inlet openings and an outlet opening adjacent one end thereof, and valves carried by said body portion adjacent the other end thereof for controlling communication between said outlet opening and said inlet openings.

3. In a plumbing fixture the combination of an elongated body portion having a pair of inlet openings and an outlet opening adjacent one end thereof, a second outlet opening adjacent the other end thereof, a mixing chamber between said inlet openings and said outlet openings, valves adjacent the last mentioned end of said body portion for controlling communication between said inlet openings and said chamber, and a valve adjustable to direct the contents of said chamber to one or the other of said outlet openings.

4. In a plumbing fixture the combination of an elongated body portion, a pair of longitudinal passages therein each having an inlet opening adjacent one end thereof, a partition closing the other ends of said passages and forming a U-shaped chamber substantially embracing said closed ends, valves diametrically disposed in said body portion and cooperating with said partition to control communication between said chamber and passages, a plurality of outlet passages leading from said chamber to the opposite ends of said body portion, and a valve in the end of said body portion adjustable to direct the contents of said chamber to one or another of said outlet passages.

In witness whereof, I hereunto subscribe my name this 15th day of February, 1927.

JULIUS S. JUDELL.